(12) United States Patent
Taguchi et al.

(10) Patent No.: US 12,384,896 B2
(45) Date of Patent: Aug. 12, 2025

(54) HARDCOAT FILM, METHOD FOR PRODUCING SAME, AND DISPLAY DEVICE

(71) Applicant: KANEKA CORPORATION, Osaka (JP)

(72) Inventors: Yusuke Taguchi, Otsu (JP); Toshifumi Matsumiya, Settsu (JP); Fumiyasu Ishiguro, Settsu (JP); Rika Mori, Settsu (JP); Satoko Komatsu, Settsu (JP); Hiroto Koma, Settsu (JP); Masahiro Miyamoto, Settsu (JP)

(73) Assignee: KANEKA CORPORATION, Osaka (JP)

( * ) Notice: Subject to any disclaimer, the term of this patent is extended or adjusted under 35 U.S.C. 154(b) by 58 days.

(21) Appl. No.: 17/905,046

(22) PCT Filed: Feb. 19, 2021

(86) PCT No.: PCT/JP2021/006354
§ 371 (c)(1),
(2) Date: Aug. 25, 2022

(87) PCT Pub. No.: WO2021/172201
PCT Pub. Date: Sep. 2, 2021

(65) Prior Publication Data
US 2023/0138855 A1 May 4, 2023

(30) Foreign Application Priority Data

Feb. 25, 2020 (JP) .................................. 2020-029285

(51) Int. Cl.
*C08J 7/046* (2020.01)
*C09D 183/06* (2006.01)
*G09F 9/30* (2006.01)

(52) U.S. Cl.
CPC ............ *C08J 7/046* (2020.01); *C09D 183/06* (2013.01); *G09F 9/301* (2013.01);
(Continued)

(58) Field of Classification Search
CPC .... C08J 7/046; C08J 2333/24; C08J 2367/03; C08J 2383/06; C08J 2301/02;
(Continued)

(56) References Cited

U.S. PATENT DOCUMENTS

2016/0108258 A1* 4/2016 Masuda ............. C01G 23/0536
428/447
2020/0142102 A1 5/2020 Kikuchi
(Continued)

FOREIGN PATENT DOCUMENTS

JP  2003-313329 A  11/2003
JP  2006-001156 A  1/2006
(Continued)

OTHER PUBLICATIONS

WO-2018207914-A1 Machine Translation via EPO (Year: 2018).*
(Continued)

*Primary Examiner* — Gordon Baldwin
*Assistant Examiner* — Christina D McClure
(74) *Attorney, Agent, or Firm* — Studebaker Brackett PLLC

(57) ABSTRACT

A hard coat film includes a transparent resin film and a hard coat layer disposed on one surface thereof, the hard coat layer being composed of a cured product of a hard coat composition. The thickness of the hard coat layer 0.15 times or more the thickness of the transparent resin film. The hard coat composition has a negative cure shrinkage ratio. The absolute value of the amount of curl of the hard coat film cut into a 100 mm×100 mm square is 20 mm or less. The hard
(Continued)

coat layer may contain a cured product of a polyorganosiloxane compound having an alicyclic epoxy group.

12 Claims, 1 Drawing Sheet

(52) U.S. Cl.
CPC ........ *C08J 2333/24* (2013.01); *C08J 2367/03* (2013.01); *C08J 2383/06* (2013.01)

(58) Field of Classification Search
CPC ................ C08J 2323/02; C08J 2333/00; C08J 2367/02; C08J 2369/00; C08J 2379/08; C08J 2483/04; C08J 7/0427; C08J 5/18; C09D 183/06; G09F 9/301; B23B 27/00; B23B 27/08; B23B 27/38; C08G 77/14
See application file for complete search history.

(56) References Cited

U.S. PATENT DOCUMENTS

| | | | |
|---|---|---|---|
| 2021/0147710 A1* | 5/2021 | Kim | ........................... C08J 7/04 |
| 2021/0348036 A1* | 11/2021 | Okamoto | ................ B32B 5/024 |

FOREIGN PATENT DOCUMENTS

| | | | | |
|---|---|---|---|---|
| JP | 2014108587 A | * | 6/2014 | |
| JP | 2015-069197 A | | 4/2015 | |
| WO | WO-2015029667 A1 | * | 3/2015 | .............. C08J 7/042 |
| WO | WO-2018207914 A1 | * | 11/2018 | ............. B32B 27/00 |
| WO | WO-2019039881 A1 | * | 2/2019 | .............. C08G 77/14 |
| WO | WO-2020027033 A1 | * | 2/2020 | ........... B32B 15/046 |

OTHER PUBLICATIONS

Takahashi, WO-2015029667-A1, machine translation, originally publsiehd 2015, p. 1-16 (Year: 2015).*
JP-2014108587-A, machine translation, originally published 2014, p. 1-8 (Year: 2014).*
International Preliminary Report on Patentability (Chapter I) and Written Opinion of the International Searching Authority issued in PCT/JP2021/006354; issued Aug. 30, 2022.
International Search Report issued in PCT/JP2021/006354; mailed May 11, 2021.
"Notice of Reasons for Refusal" Office Action issued in JP 2022-503333; mailed by the Japanese Patent Office on Jan. 21, 2025.

* cited by examiner

HARDCOAT FILM, METHOD FOR PRODUCING SAME, AND DISPLAY DEVICE

TECHNICAL FIELD

The present application relates to a hard coat film having a hard coat layer disposed on a principal surface of a resin film, and a method for producing the hard coat film. The present application also relates to an image display device having the hard coat film.

BACKGROUND ART

With rapid progress of electronic devices such as displays, touch panels and solar cells, it has been required to make devices thinner, lighter and flexible. In response to these demands, an attempt has been made to replace glass materials, which are used for substrates, cover windows, etc., with plastic film materials. In these applications, plastic films are required to have high heat resistance, dimensional stability at a high temperature, and high mechanical strength. In recent years, curved displays (flexible displays and foldable displays) have been developed, and excellent transparency and flexibility (flex resistance), as well as the above-described characteristics, are required in plastic films especially one used for a cover window and the like.

In Patent Document 1, a hard coat film in which a hard coat layer composed of acryl-based material is disposed on a polyethylene terephthalate film is disclosed as a transparent substrate material for flexible displays.

PATENT DOCUMENTS

Patent Document 1: Japanese Patent Laid-Open No. 2015-69197

SUMMARY

Problems to be Solved

A member disposed on a display surface such as a cover window is required to have high hardness, and accordingly, a hard coat film having hard coat layer with a large thickness is required.
However, when a thickness of a hard coat layer is made large in a hard coat film produced using an acryl-based hard coat material, it may be difficult to handle the film as the film is warped (curled) with the hard coat layer-formed surface on the inner side. In view of the situations described above, an object of the present application is to provide a hard coat film which is less curled even when a hard coat layer has a large thickness.

Solution

The present inventors have found that the amount of curling of a hard coat film can be controlled by using a material having a negative cure shrinkage ratio to a hard coat layer, leading to completion of the present application.

An embodiment of the present application is a hard coat film having a hard coat layer on one principal surface of a transparent resin film. A hard coat composition is applied onto a principal surface of the transparent resin film, and irradiated with an active energy ray to form the hard coat layer.

Examples of the resin material for the transparent resin film include polyesters, polycarbonates, polyamides, poly-imides, cyclic polyolefins, acrylic resins, and cellulose-based resins. The thickness of the transparent resin film may be 10 to 150 μm.

The thickness of the hard coat layer is 0.15 times or more the thickness of the transparent resin film. The thickness of the hard coat layer may be 3 times or less the thickness of the transparent resin film. The thickness of the hard coat layer may be 2 to 150 μm.

A hard coat composition having a negative cure shrinkage ratio is used. The hard coat composition may contain a polyorganosiloxane compound having an alicyclic epoxy group. The weight average molecular weight of the polyorganosiloxane compound may be 500 to 20,000.

A polyorganosiloxane compound having an alicyclic epoxy group is obtained by, for example, condensation of a silane compound having an alicyclic epoxy group. The hard coat composition may contain a photocationic polymerization initiator.

When the hard coat composition is cured on the transparent resin film, the hard coat composition may be irradiated with an active energy ray in a heating atmosphere. The heating temperature may be 45 to 150° C. The hard coat composition may be irradiated with an active energy ray with a support film bonded to a hard coat layer-non-formed surface of the transparent resin film. The hard coat composition may be heated after being irradiated with an active energy ray.

The absolute value of the amount of curl of the hard coat film cut into a square having a size of 100 mm×100 mm may be 20 mm or less. The linear expansion coefficient of the hard coat layer may be larger than the linear expansion coefficient of the transparent resin film.

According to the present application, a hard coat film is obtained which has a hard coat layer having a large thickness and where the amount of curling of the hard coat layer is minimal.

DETAILED DESCRIPTION

Outline of Hard Coat Film

Figure 1:
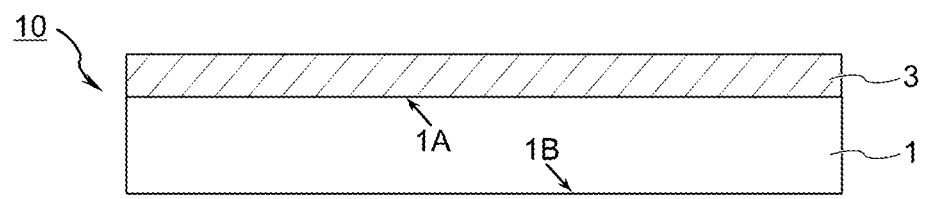
FIG. 1 is a sectional view of a hard coat film.

FIG. 1 is a sectional view of a laminate according to an embodiment of the present application. The laminate is a hard coat film 10 including a hard coat layer 3 on one principal surface 1A of a transparent resin film.

The transparent resin film 1 is a flexible film base material serving as a base for formation of a hard coat layer. The total light transmittance of the transparent resin film is preferably 80% or more, more preferably 85% or more, further preferably 90% or more. The haze of the transparent resin film is preferably 2% or less, more preferably 1% or less.

The resin material that forms the transparent resin film is not particularly limited as long as it is a transparent resin. Examples of the transparent resin include polyesters such as polyethylene terephthalate (PET) and polyethylene naphthalate (PEN), polycarbonates, polyamides, transparent polyimides, cyclic polyolefins, acrylic resins such as polymethyl methacrylate (PMMA), and cellulose-based resins such as triacetyl cellulose (TAC).

Among them, polyesters such as PET and transparent polyimides are preferable because of high mechanical strength. When a hard coat film is used for a cover window of a display, a transparent polyimide is particularly preferable as a resin material for the transparent resin film because a film base material is required to have excellent heat resistance and mechanical strength. Although a general fully aromatic polyimide is colored yellow or brown, a transparent polyimide having a high visible light transmittance can be obtained by introduction of an alicyclic structure, introduction of a bent structure, introduction of a fluorine substituent, or the like.

The transparent resin film may have a single layer or a multilayer structure. For example, the transparent resin film may be a laminate obtained by bonding a plurality of films together, or may be one in which functional layers such as an adhesion enhancement layer, an antistatic layer and an antireflection layer are provided on a hard coat layer-formed surface (first principal surface 1A) and/or a hard coat layer-non-formed surface (second principal surface 1B).

The thickness of the transparent resin film is not particularly limited, and is preferably 10 μm or more, more preferably 30 μm or more, further preferably 40 μm or more. The thickness of the transparent resin film is preferably 150 μm or less, more preferably 100 μm or less, further preferably 80 μm or less, particularly preferably 60 μm or less. If the thickness of the transparent resin film is small, for example, less than 10 μm, mechanical properties, such as surface hardness, of the hard coat film may be insufficient. On the other hand, if the thickness of the transparent resin film is large, for example, greater than 150 μm the transparency and flexibility of the hard coat film may be deteriorated.

The thickness of the hard coat layer 3 is not particularly limited, and is preferably 2 μm or more, more preferably 5 μm or more, further preferably 10 μm or more, from the viewpoint of surface hardness, and may be 20 μm or more, 30 μm or more, 40 μm or more, or 50 μm or more. From the viewpoint of transparency and flexibility (flex resistance), the thickness of the hard coat layer is preferably 150 μm or less, more preferably 100 μm or less, further preferably 90 μm or less, and may be 80 μm or less or 70 μm or less.

The total thickness of the hard coat film, i.e. sum of the thickness of the transparent resin film 1 and the hard coat layer 3 is about 15 to 1,000 μm, preferably 20 μm or more, more preferably 30 μm or more, further preferably 40 μm or more, particularly preferably 50 μm or more. The total thickness of the hard coat layer is preferably 250 μm or less, more preferably 170 μm or less, further preferably 150 μm or less, particularly preferably 110 μm or less.

The ratio of the thickness $d_2$ of the hard coat layer 3 to the thickness $d_1$ of the transparent resin film 1, $d_2/d_1$, is 0.15 or more, preferably 020 or more, more preferably 0.40 or more, and may be 0.60 or more, 0.80 or more, or 1.00 or more. In general, if the thickness $d_2$ of the hard coat layer is large, for example, greater than 150 μm, so that $d_2/d_1$ becomes large, curling of the hard coat film tends to increase. In contrast, as described later, the curling tends to be reduced by using a hard coat material having a negative cure shrinkage ratio. The upper limit of the thickness ratio $d_2/d_1$ is not particularly limited, and from the viewpoint of formability and flexibility of the hard coat layer, $d_2/d_1$ is preferably 3.00 or less, more preferably 2.00 or less, further preferably 1.80 or less, and may be 1.60 or less or 1.40 or less.

The linear expansion coefficient of the hard coat layer 3 is preferably larger than the linear expansion coefficient of the transparent resin film 1. The linear expansion coefficient is a calculated value from a thermomechanical analysis (TMA) curve in cooling from a temperature of 100° C. to 30° C. The linear expansion coefficient of the hard coat layer in the hard coat film is measured using a sample obtained by dissolving a transparent resin film with a solvent or the like and isolating the hard coat layer.

Because the linear expansion coefficient of the hard coat layer is relatively large, stress generated at the interface between the hard coat layer and the transparent resin film during curing of the hard coat material having a negative cure shrinkage ratio is canceled due to a difference in linear expansion coefficient (difference in the amount of dimensional change on heating), so that curling of the hard coat film can be controlled to be a desired value.

From the viewpoint of stability in control of curling of the hard coat film, the difference in linear expansion coefficient between the transparent resin film and the hard coat layer is preferably 100 ppm/° C. or less, more preferably 70 ppm/° C. or less, further preferably 50 ppm/° C. or less. The difference in linear expansion coefficient is preferably 5 ppm/° C. or more, and may be 10 ppm/° C. or more, 20 ppm/° C. or more, or 30 ppm/° C. or more.

The absolute value of the amount of curling of a sample obtained by cutting the hard coat film into a square of 100 mm×100 mm is preferably 20 mm or less at room temperature (25° C.). The amount of curling of the hard coat film is evaluated with the hard coat film placed on a horizontal table with the hard coat layer 3-formed surface on the upper side. The distances of the table to the four vertexes of the square (amount of elevation) are measured, and the average value thereof is taken as the amount of curling. When an in-plane central portion of the film is elevated (when curling occurs in an opposite direction), the amount of curling is measured with the film placed on a table with the hard coat layer-formed surface on the lower side. In this case, the amount of curling is a negative value.

If the hard coat material is photocationically curable, an acid as an active species generated by irradiating a photocationic polymerization initiator (photoacid generator) with light has a longer life than a photoradical, and a curing reaction continues for several days even after light irradiation. Accordingly, the amount of curling caused by a change in dimension of the hard coat layer may vary with time. For reducing the effect of the temporal change, a value measured 10 days after the curing treatment (photocuring) is adopted as the amount of curling.

In a process of producing a display or the like including a hard coat film, the hard coat film may be cut into a sheet having a predetermined size, then placed on a belt conveyor or the like and conveyed. Here, if the amount of downward curling is large, the end portion of the film may enter a gap between conveyors, and the film may fall from a conveyance apparatus. If upward curling is large, there is a possibility that when the hard coat film is fixed by suction from the lower surface for printing etc., the fixation by suction is difficult due to a large gap between a suction apparatus and the film.

Thus, it is preferable that the amount of curling of the hard coat film is small regardless of whether the hard coat layer is disposed on the upper surface or the lower surface. The absolute value of the amount of curling of the hard coat film cut into a square of 100 mm×100 mm is more preferably 15 mm or less, further preferably 10 mm or less, may be 7 mm or less, or 5 mm or less, and is ideally 0.

In the present application, a material having a negative cure shrinkage ratio, i.e. a material that expands to increase in volume when cured, is used. The cure shrinkage ratio of the hard coat material is a volumetric shrinkage ratio determined by a density method in accordance with JIS K 6901: 2008, and is defined as follows. $\rho_C$ is a density after curing, and $\rho_L$ is a density before curing. The density of liquid is measured by pycnometry, and the density of solid is measured by a density-gradient tube method.

Cure shrinkage ratio (%)=100×($\rho_C$−$\rho_L$)/$\rho_C$

A common hard coat material such as acrylic material has a positive cure shrinkage ratio (shrinks with curing). Therefore, if the thickness of a hard coat layer increases, compressive stress at the interface between a transparent resin film and the hard coat layer tends to increase, leading to expansion of warpage (curling) of the film with the hard coat layer-formed surface on the inner side. In contrast, when the hard coat material has a negative cure shrinkage, curling with the hard coat layer-formed surface on the inner side tends to be reduced.

On the other hand, if the cure shrinkage ratio is excessively small (volumetric expansion during curing is excessively large), the hard coat film tends to be curled with the hard coat layer-formed surface on the outer side, so that it may be impossible to appropriately control curling even with a difference in linear expansion ratio between the transparent resin film and the hard coat layer. Thus, the cure shrinkage ratio of the hard coat material is preferably −10% or more, more preferably −5% or more, further preferably −3% or more. The cure shrinkage ratio is preferably −0.01% or less, more preferably −0.1% or less, further preferably −0.5% or less, and may be −1% or less, or −1.5% or less.

Hard Coat Layer

A hard coat material (hard coat composition) containing a curable resin is applied onto a transparent resin film, and cured to form a hard coat layer. As described above, the hard coat material has a negative cure shrinkage ratio. The cure shrinkage ratio of the hard coat material depends mainly on the structure of a curable resin, particularly on the type of a curable functional group. For example, a material having an alicyclic epoxy group as a curable functional group may exhibit a negative cure shrinkage due to photocationic polymerization.

Hereinafter, a specific example will be given to describe an embodiment in which a hard coat layer is formed from a hard coat material using a polyorganosiloxane compound having an alicyclic epoxy group as a resin material having a negative cure shrinkage ratio.

Polyorganosiloxane Compound

Silane Compound

A polyorganosiloxane compound having an alicyclic epoxy group is obtained by condensation of a silane compound of the following general formula (1).

(1)

$R^3$ is a hydrogen atom or an alkyl group. The number of carbon atoms in the alkyl group is preferably 1 to 10. Specific examples of the alkyl group having 1 to 10 carbon atoms include a methyl group, an ethyl group, a propyl group, a butyl group, a pentyl group, a hexyl group, a heptyl group, an octyl group, a nonyl group, a decyl group, an isopropyl group, an isobutyl group, a cyclohexyl group, and an ethylhexyl group. x is 2 or 3.

The silane compound represented by general formula (1) (hereinafter, sometimes referred to as "silane compound (1)") has two or three (—OR$^3$) groups in one molecule. Because Si—OR$^3$ is hydrolyzable, a polyorganosiloxane compound is obtained by condensation of a silane compound. From the viewpoint of hydrolyzability, the number of carbon atoms in R$^3$ is preferably 3 or less, and R$^3$ is particularly preferably a methyl group.

$R^2$ is a hydrogen atom, or a monovalent hydrocarbon group selected from the group consisting of an alkoxy group having an alkyl group having 1 to 10 carbon atoms, an alkyl group having 1 to 10 carbon atoms, an aryl group having 6 to 25 carbon atoms, and an aralkyl group having 7 to 12 carbon atoms. Specific examples of the hydrocarbon in the alkyl group and the aralkyl group include a methyl group, an ethyl group, a propyl group, a butyl group, a pentyl group, a hexyl group, a heptyl group, an octyl group, a nonyl group, a decyl group, an isopropyl group, an isobutyl group, a cyclohexyl group, an ethylhexyl group, a benzyl group, a phenyl group, a tolyl group, a xylyl group, a naphthyl group, and a phenethyl group.

E in general formula (1) is an alicyclic epoxy group. Because the alicyclic epoxy group maintains an alicyclic structure even when the epoxy group is ring-opened, the cure shrinkage is small, and it is likely that a negative cure shrinkage ratio is exhibited. The alicyclic epoxy group has an epoxy group composed of two adjacent carbon atoms forming an alicyclic ring, and an oxygen atom. Examples of the alicyclic ring include a cyclobutane ring, a cyclopentane ring, a cyclohexane ring, and a cyclooctyl ring. In particular, from the viewpoint of structural stability and reactivity of the epoxy group, the alicyclic epoxy group is preferably one having a six-membered alicyclic structure, such as cyclohexene oxide or methylcyclohexene oxide.

$R^1$ is an alkylene group having 2 to 12 carbon atoms, and B is a direct bond, ether group (—O—), or ester group (—COO—). That is, the silane compound of general formula (1) is a compound in which an alicyclic epoxy group is bonded to a Si atom through —BR$^1$— as a spacer. From the viewpoint of, for example, curing reactivity of the alicyclic epoxy group, B is preferably a directly bond (i.e. an alicyclic epoxy group is directly bonded to alkylene R$^1$), or an ester.

Specific examples of the alkylene R$^1$ include a dimethylene group, a trimethylene group, a tetramethylene group, a pentamethylene group, a hexamethylene group, a heptamethylene group, an octamethylene group, a nonamethylene group, a decamethylene group, an undecamethylene group, and a dodecamethylene group. R$^1$ may be one in which a part or all of hydrogen atoms of methylene (—CH$_2$—) are replaced by a substituent having 1 to 6 carbon atoms. Examples of the substituent having 1 to 6 carbon atoms include a methyl group, an ethyl group, a propyl group, a butyl group, a pentyl group, a hexyl group, a cyclohexyl group, and a phenyl group.

There is a tendency that the distance between a Si atom and an alicyclic epoxy group becomes larger and the flex resistance of the hard coat layer after curing is improved as the number of carbon atoms in the main chain of the alkylene R$^1$ increases and the chain length becomes larger. On the other hand, the hardness of the hard coat layer tends to increase as the number of carbon atoms in the main chain of R$^1$ decreases.

Specific examples of the silane compound of the general formula (1) include β-(3,4-epoxycyclohexyl)ethyltrimethoxysilane, β-(3,4-epoxycyclohexyl)ethylmethyldimethoxysilane, γ-(3,4-epoxycyclohexyl)propyltrimethoxysilane, γ-(3,4-epoxycyclohexyl)propylmethyldimethoxysilane, β-(3,4-epoxycyclohexyl)

ethyltriethoxysilane, β-(3,4-epoxycyclohexyl) ethylmethyldiethoxysilane, γ-(3,4-epoxycyclohexyl) propyltriethoxysilane and γ-(3,4-epoxycyclohexyl) propylmethyldiethoxysilane.

In addition to the silane compound having an alicyclic epoxy group and represented by the above general formula (1), other silane compounds may be used for obtaining a polyorganosiloxane compound by condensation of silane compound. One other silane compound (i.e. a silane compound free of an alicyclic epoxy group; hereinafter, sometimes referred to as "silane compound (2)") is represented by the following general formula (2).

In general formula (2), $R^2$, $R^3$ and x are the same as in general formula (1). $R^4$ is a monovalent organic group free of an alicyclic epoxy group. $R^4$ is a group containing a substituted or unsubstituted double bond (e.g. a substituted or unsubstituted alkenyl group having 1 to 10 carbon atoms), a substituted or unsubstituted alkyl group having 1 to 10 carbon atoms, an aryl group having 6 to 25 carbon atoms, an aralkyl group having 7 to 12 carbon atoms, a group having a glycidyl group, a group having an oxetanyl group, or a hydrogen atom.

When a polyorganosiloxane compound is obtained by condensation of a silane compound, the ratio of the amount of silane compound (1) to the total amount of silane compound (1) and silane compound (2) is preferably 33 to 100 mol %, and more preferably 50 to 100 mol %. The ratio of silane compound (1) may be 60 mol % or more, 70 mol % or more, 80 mol % or more, 90 mol % or more, or 95 mol % or more, or may be 100 mol %.

Properties of Polyorganosiloxane Compound

By hydrolysis and condensation of the Si—$OR^3$ moiety of the silane compound, a Si—O—Si bond is formed between the silane compounds so that a polyorganosiloxane compound is produced. From the viewpoint of enhancing the hardness of a cured film (hard coat layer), the weight average molecular weight of the polyorganosiloxane compound is preferably 500 or more. From the viewpoint of suppressing volatilization, the weight average molecular weight of the polyorganosiloxane compound is preferably 500 or more. On the other hand, if the molecular weight is excessively large, cloudiness may occur due to, for example, a decrease incompatibility with other compositions. Thus, the weight average molecular weight of the polyorganosiloxane compound is preferably 20,000 or less. The weight average molecular weight of the polyorganosiloxane compound is more preferably 700 to 18,000, further preferably 1,000 to 16,000, and may be 1,200 to 14,000 or 1,500 to 12,000.

The weight average molecular weight of the polyorganosiloxane compound can be controlled by appropriately selecting the amount of water and the type and amount of a catalyst which are used in the reaction. For example, the weight average molecular weight tends to increase as the amount of water added together with the catalyst in the hydrolysis reaction.

The polyorganosiloxane compound produced by hydrolytic condensation of the silane compound of general formula (1) contains a structural unit of the following formula (3) and a structural unit of the following formula (4).

In general formulae (3) and (4), E, B and $R^1$ are the same as in general formula (1). D in general formula (4) is a hydrogen atom, or a group selected from the group consisting of an alkoxy group having an alkyl group having 1 to 10 carbon atoms, an alkyl group having 1 to 10 carbon atoms, an aryl group having 6 to 25 carbon atoms, and an aralkyl group having 7 to 12 carbon atoms.

The constituent unit of formula (3) has a structure in which all three alkoxy groups (Si—$OR^3$) of a silane compound having a T unit structure where x=3 in general formula (1) undergo a condensation reaction to form a Si—O—Si bond. This constituent unit is referred to as a "T3 form". The constituent unit of formula (4) has a structure in which two of three alkoxy groups of a silane compound having a T unit structure where x=3 in general formula (1) undergo a condensation reaction to form a Si—O—Si bond. This constituent unit is referred to as a "T2 form".

The flex resistance of the hard coat layer obtained by curing the polyorganosiloxane compound tends to be improved as the ratio of the structure (T3 form) of formula (3) to the structure (T2 form) of formula (4), [T3 form]/[T2 form], decreases. From the viewpoint of obtaining a hard coat film in which a hard coat layer is less cracked or broken at the time of bending, the ratio of the T3 form to the T2 form in the polyorganosiloxane compound (hereinafter, sometimes referred to as a "T3/T2 ratio") may be less than 5, and may be 4 or less, 3.5 or less, 3 or less, or 2.5 or less. From the viewpoint of securing the hardness of the hard coat layer, the T3/T2 ratio in the polyorganosiloxane compound may be 0.8 or more, 1 or more, 1.5 or more, or 2 or more.

The contents and proportions of the T3 form and the T2 form in the polyorganosiloxane compound can be calculated from $^{29}$Si-NMR measurement. In $^{29}$Si-NMR, the Si atom of the T3 form and the Si atom of the T2 form show different chemical shifts, and therefore, the integral values of the signals of the respective Si atoms in the NMR spectrum can be determined, followed by calculation of the T3/T2 ratio from the ratio between the integral values.

The T3/T2 ratio can be controlled by adjusting the amount of water and the type and amount of a catalyst which are used in the hydrolytic condensation reaction of the silane compound. For example, the T3/T2 ratio tends to become larger as the amount of the catalyst increases. As described later, use of a neutral salt catalyst tends to reduce T3/T2.

Hydrolysis and Condensation of Silane Compound

By reacting the silane compound with water, the Si—$OR^3$ moiety of the silane compound is hydrolyzed, and the hydrolyzate is condensed to obtain a polyorganosiloxane compound. The amount of water used for the hydrolysis and the condensation reaction is preferably 0.3 to 3 equivalents, more preferably 0.5 to 2 equivalents, based on 1 equivalent of the —$OR^3$ group bonded to a Si atom. If the amount of water is excessively small, there is a tendency that many $OR^3$ groups remain without being hydrolyzed, so that the polyorganosiloxane compound has a small molecular weight, resulting in insufficient hardness of the hard coat layer. If the amount of water is excessively large, there is a tendency that the reaction rate of the hydrolysis and condensation reaction is high, so that a condensate having a high molecular weight is produced, leading to deterioration of the transparency and flexibility of the hard coat layer.

In the hydrolysis reaction and the condensation reaction of the silane compound, it is preferable to suppress deactivation due to ring-opening of the alicyclic epoxy group contained in silane compound (1). From the viewpoint of suppressing ring opening of the epoxy group, it is preferable to carry out the reaction under neutral or basic conditions. In particular, from the viewpoint of reducing the T3/T2 ratio of the polyorganosiloxane compound obtained as a condensate of the silane compound, it is preferable to carry out the hydrolysis and condensation reaction in the presence of a neutral salt catalyst.

The neutral salt is a normal salt of a strong acid and a strong base, specifically a salt of an ion (cation) of an element selected from the group consisting of an alkali metal element and a Group 2 element and a halide ion (anion) selected from the group consisting of a chloride ion, a bromide ion and an iodide ion.

Specific examples of the neutral salt include lithium chloride, sodium chloride, potassium chloride, beryllium chloride, magnesium chloride, calcium chloride, lithium bromide, sodium bromide, potassium bromide, beryllium bromide, magnesium bromide, calcium bromide, lithium iodide, sodium iodide, potassium iodide, beryllium iodide, magnesium iodide, and calcium iodide.

As described above, a polyorganosiloxane compound having a small T3/T2 ratio can be obtained by using a neutral salt catalyst. For acid catalysts and base catalysts, the catalyst itself reacts electrophillically and nucleophilically with various substances. On the other hand, neutral salts are less erosive against metals and resin materials of reaction vessels or storage vessels, and therefore have an advantage in that there are few limitations for the use of these materials for production and storage equipment.

If a basic catalyst that is commonly used for a condensation reaction of a silane compound remains in the hard coat composition, an acid generated from a photocationic polymerization initiator (photoacid generator) may be quenched to hinder the polymerization reaction. On the other hand, hindrance to polymerization inhibition can be suppressed by using a neutral salt catalyst. Thus, a neutral salt catalyst may remain in the polyorganosiloxane compound obtained by condensation of the silane compound, or the hard coat composition, and steps of removal or neutralization of the catalyst after the reaction, and the like can be omitted. Therefore, use of a neutral salt catalyst can contribute to simplification of the production process and improvement of the yield.

The amount of the catalyst is not particularly limited. The hydrolysis and condensation reaction of the silane compound tends to be promoted as the amount of the catalyst increases. On the other hand, if the amount of the catalyst is excessively large, the transparency of the condensate may be impaired, or purification may be complicated. The amount of the neutral salt catalyst is preferably 0.000001 to 0.1 mol, more preferably 0.000005 to 0.01 mol, based on 1 mol of the hydrolyzable silyl group (—OR$^3$) of the silane compound.

As described above, a neutral salt catalyst may remain in the polyorganosiloxane compound obtained by the hydrolysis and condensation reaction of the silane compound. The amount of the neutral salt (catalyst) remaining in the polyorganosiloxane compound may be 1 ppm or more, or may be 10 ppm or more, 50 ppm or more, or 100 ppm or more. From the viewpoint of the transparency of the hard coat layer, the amount of the basic catalyst remaining in the polyorganosiloxane compound is preferably 10,000 ppm or less, more preferably 5,000 ppm or less, further preferably 3,000 ppm or less, and may be 1,000 ppm or less, 800 ppm or less, or 500 ppm or less.

In the hydrolysis and condensation reaction of the silane compound, the reaction may be carried out while a diluent solvent, an alcohol generated by hydrolysis, and the like are refluxed. The diluent solvent is preferably one having compatibility with water, and is preferably a water-soluble alcohol or ether compound. Because most silane compounds have low compatibility with neutral salts and water used for hydrolysis, it is preferable that the silane compound is formed into a solution with a diluent solvent, and reacted as a compatible system.

The boiling point of the diluent solvent is preferably 40° C. or higher, more preferably 50° C. or higher, further preferably 60° C. or higher. If the boiling point of the diluent solvent is excessively low, the diluent solvent may be brought into a refluxed state at a low temperature, leading to a decrease in reaction rate. From the viewpoint of removability of the diluent solvent after the reaction, the boiling point of the diluent solvent is preferably 200° C. or lower.

Specific examples of the diluent solvent include methanol, ethanol, 1-propanol, 2-propanol, 2-butanol, 1-methoxy-2-propanol, ethylene glycol monomethyl ether, ethylene glycol dimethyl ether, propylene glycol monomethyl ether, and propylene glycol dimethyl ether.

The reaction temperature in the hydrolysis and condensation reaction of the silane compound is preferably 40° C. or higher, more preferably 50° C. or higher, further preferably 60° C. or higher. When the reaction temperature is 40° C. or higher, the reaction time can be shortened because the catalytic activity of the neutral salt is high. From the viewpoint of suppressing side reactions of the organic groups of the silane compound, the reaction temperature is preferably 200° C. or lower.

From the viewpoint of increasing the crosslink point density in the cured product (hard coat layer) to improve hardness, the residual ratio of alicyclic epoxy groups in the polyorganosiloxane compound obtained by hydrolysis and condensation of the silane compound is preferably high. The residual ratio of alicyclic epoxy groups, i.e. the ratio of the number of moles of alicyclic epoxy groups in the polyorganosiloxane compound obtained by condensation to the number of moles of alicyclic epoxy groups contained in silane compound (1) as a raw material, is preferably 20% or more, more preferably 40% or more, further preferably 60% or more, particularly preferably 80% or more, and may be 90% or more, or 95% or more. The residual ratio of alicyclic epoxy groups is determined by $^1$H-NMR measurement.

In the hydrolysis and condensation reaction, E-B—R$^1$— bonded to the Si atom of silane compound (1) does not undergo reactions other than side reactions such as ring-opening of epoxy groups, and the structure thereof is maintained. Therefore, the polyorganosiloxane compound obtained by condensation of silane compound (1) has a structure of the following general formula (5) (hereinafter, sometimes referred to as "structure (5)").

[E-B—R$^1$—Si]   (5)

In general formula (5), E, B and R$^1$ are the same as in general formula (1). That is, the structure (5) is a structure in which an alicyclic epoxy group is bonded to a Si atom with or without another organic group interposed therebetween.

The ratio of the number of structures (5) (i.e. the number of alicyclic epoxy groups) to the total number of Si atoms in the polyorganosiloxane compound is preferably 33% or more, more preferably 50% or more, and may be 60% or more, 70% or more, 80% or more, 90% or more, or 95% or more, or may be 100%.

Because silane compound (1) and silane compound (2) have one Si atom per molecule, the polyorganosiloxane compound produced by condensation of N molecules of the silane compound contains N Si atoms. When the alicyclic epoxy group remains without reacting during the hydrolysis and condensation reaction, n structures (5) are produced from n silane compounds (1). Therefore, in the polyorganosiloxane compound obtained by condensation of the silane compound, the ratio of silane compound (1) (molar ratio: n/N) in the silane compound used as a raw material is substantially equal to the ratio of structure (5) to the number of Si atoms in the polyorganosiloxane compound.

When silane compound (2) as well as silane compound (1) is used as silane compounds, the polyorganosiloxane compound has a structure of the following general formula (6) (hereinafter, sometimes referred to as "structure (6)") in addition to the above structure (5).

$[R^4—Si]$ (6)

In general formula (6), $R^4$ is the same as in general formula (2).

Hard Coat Composition

The hard coat composition is a composition containing the curable resin. It is preferable that the hard coat composition contains a photopolymerization initiator in addition to a curable resin such as a polyorganosiloxane compound, and the hard coat composition may contain other components.

Photocationic Polymerization Initiator

When the curable resin is a polyorganosiloxane compound having an epoxy group, it is preferable that the hard coat composition contains a photocationic polymerization initiator. The photocationic polymerization initiator is a compound (photoacid generator) which generates an acid by irradiation with an active energy ray. The acid generated from the photoacid generator causes the ring-opening and polymerization reaction of the epoxy group in the polyorganosiloxane compound, so that an intermolecular cross-linkage is formed to cure the hard coat material.

Photoacid generators include strong acids such as toluenesulfonic acid and boron tetrafluoride; onium salts such as sulfonium salts, ammonium salts, phosphonium salts, iodonium salts and selenium salt; iron-allene complexes; silanol-metal chelate complexes; sulfonic acid derivatives such as disulfones, disulfonyldiazomethanes, disulfonylmethanes, sulfonylbenzoylmethanes, imidosulfonates and benzoinsulfonates; and organic halogen compounds.

Among the above photoacid generators, aromatic sulfonium salts or aromatic iodonium salts are preferable because the hard coat composition containing a polyorganosiloxane compound having an alicyclic epoxy group has high stability. Examples of the counter anion thereof include fluorophosphate anions, fluoroantimonate anions, and fluoroborate anions. When a photoacid generator containing any of these counter anions is used, it is easy to obtain a hard coat layer which is photocured at a high rate, and is excellent in adhesion to a transparent resin film.

The content of the photocationic polymerization initiator in the hard coat composition is preferably 0.05 to 10 parts by weight, more preferably 0.1 to 5 parts by weight, 0.2 to 2 parts by weight, based on 100 parts by weight of the polyorganosiloxane compound.

Leveling Agent

The hard coat composition may contain a leveling agent. When the hard coat layer contains a leveling agent, reduction of surface tension, improvement of surface smoothness, improvement of slippage, improvement of antifouling properties (fingerprint resistance etc.), and the like can be expected. When the leveling agent contains a group having reactivity with an epoxy group and/or a group having a hydrolytic condensation property, improvement of the scratch resistance of the hard coat layer can be expected.

Examples of the leveling agent include silicone-based leveling agents and fluorine-based leveling agents. Examples of the silicone-based leveling agent include leveling agents having a polyorganosiloxane backbone. Examples of the fluorine-based leveling agent include leveling agents having a fluoro aliphatic hydrocarbon backbone. Examples of the fluoro aliphatic hydrocarbon backbone include fluoro $C_{1-10}$ alkanes such as fluoromethane, fluoroethane, fluoropropane, fluoroisopropane, fluorobutane, fluoroisobutane, fluoro-t-butane, fluoropentane, and fluorohexane.

When the hard coat composition contains a leveling agent, the content thereof is preferably 0.001 to 10 parts by weight, more preferably 0.01 to 5 parts by weight, further preferably 0.05 to 1 parts by weight or less, based on 100 parts by weight of the polyorganosiloxane compound.

Reactive Diluent

The hard coat composition may include a reactive diluent. The reactive diluent may include, for example, a cationically polymerizable compound other than the above-described polyorganosiloxane compound. As the reactive diluent for photocationic polymerization, a compound having a cationically polymerizable functional group is used. Examples of the cationically polymerizable functional group of the reactive diluent include an epoxy group, a vinyl ether group, an oxetane group and an alkoxysilyl group. In particular, the reactive diluent is preferably one having an epoxy group because of high reactivity with the epoxy group of the polyorganosiloxane compound.

The content of the reactive diluent in the hard coat composition is preferably 100 parts by weight or less, more preferably 50 parts by weight or less, based on 100 parts by weight of the polyorganosiloxane compound.

Photosensitizer

The hard coat composition may contain a photosensitizer for the purpose of, for example, improving photosensitivity of the photocationic polymerization initiator (photo acid generator). Because a more efficient photosensitizer is capable of absorbing light at a range of wavelengths that cannot be absorbed by the photoacid generator itself, it is preferable that the range of wavelengths absorbed by both the photosensitizer and the photoacid generator is preferably small. Examples of the photosensitizer include anthracene derivatives, benzophenone derivatives, thioxanthone derivatives, anthraquinone derivatives and benzoin derivatives.

The content of the photosensitizer in the hard coat composition is preferably 50 parts by weight or less, more preferably 30 parts by weight or less, further preferably 10 parts by weight or less, based on 100 parts by weight of the photoacid generator.

Particles

The hard coat composition may contain particles for the purpose of, for example, adjusting film characteristics such as surface hardness and flex resistance or suppressing curing shrinkage. As the particles, organic particles, inorganic particles, organic-inorganic composite particles and the like may be appropriately used. Examples of the material of the organic particles include poly(meth)acrylic acid alkyl esters, crosslinked poly(meth)acrylic acid alkyl esters, crosslinked styrene, nylon, silicone, crosslinked silicone, crosslinked urethane and crosslinked butadiene. Examples of the material of the inorganic particles include metal oxides such as silica, titania, alumina, tin oxide, zirconia, zinc oxide and antimony oxide; metal nitrides such as silicon nitride and boron nitride; and metal salts such as calcium carbonate, calcium hydrogenphosphate, calcium phosphate and aluminum phosphate. Examples of the organic-inorganic composite filler include those having an inorganic layer formed on the surfaces of organic particles, and those having an organic layer or organic fine particles formed on the surfaces of inorganic particles.

The shape of the particle may be a spherical shape, a powder shape, a fibrous shape, a needle shape, a scale shape, etc. The spherical particles have no anisotropy and hardly cause uneven distribution of stress, so that occurrence of strain is suppressed, which can contribute to suppression of curling due to volume curing during curing the hard coat material, etc.

The average particle diameter of the particles is, for example, about 5 nm to 10 µm. From the viewpoint of enhancing the transparency of the hard coat layer, the average particle size is preferably 1,000 nm or less, more preferably 500 nm or less, further preferably 300 nm or less, particularly preferably 100 nm or less. The particle diameter can be measured by a laser diffraction/scattering type particle diameter distribution measuring apparatus, and the volume-based median diameter is taken as an average particle diameter.

The hard coat composition may contain surface-modified particles. Surface modification of particles tends to improve the dispersibility of the particles in the polyorganosiloxane compound. When the surfaces of particles are modified with a polymerizable functional group capable of reacting with an epoxy group, improvement of film strength can be expected because functional groups on the surfaces of the particles react with epoxy groups of the polyorganosiloxane compound to form a chemical crosslinkage.

Examples of the polymerizable functional group capable of reacting with the epoxy group include a vinyl group, a (meth)acrylic group, a hydroxy group, a phenolic hydroxy group, a carboxy group, an acid anhydride group, an amino group, an epoxy group and an oxetane group. Among them, an epoxy group is preferable. In particular, particles surface-modified with an epoxy group are preferable because a chemical crosslinkage can be formed between the particle and the polyorganosiloxane compound in curing of the hard coat composition by photocationic polymerization.

Examples of particles having a reactive functional group on the surfaces thereof include surface-modified inorganic particles and core-shell polymer particles.

Solvent

The hard coat composition may be solvent-free or may contain a solvent. When the hard coat composition contains a solvent, the solvent is preferably one in which the transparent resin film is not soluble. On the other hand, use of a solvent having solvency allowing the transparent resin film to swell may improve adhesion between the transparent resin film and the hard coat layer. The amount of the solvent is preferably 500 parts by weight or less, more preferably 300 parts by weight or less, further preferably 100 parts by weight or less, based on 100 parts by weight of the polyorganosiloxane compound.

Additives

The hard coat composition may contain additives such as inorganic pigments, organic pigments, surface conditioners, surface modifiers, plasticizers, dispersants, wetting agents, thickeners and antifoaming agents. The hard coat composition may contain a thermoplastic or thermosetting resin material other than the polyorganosiloxane compound. When the resin material other than the polyorganosiloxane compound and/or the polyorganosiloxane compound has radical polymerizability, the hard coat composition may contain a photoradical polymerization initiator in addition to the photocationic polymerization initiator.

Formation of Hard Coat Layer

The hard coat composition is applied onto the transparent resin film, a solvent is removed by drying if necessary, and the hard coat composition is cured by irradiation with an active energy ray to obtain a hard coat film in which the hard coat layer 3 is disposed on the transparent resin film 1.

A surface of the transparent resin film may be subjected to surface treatment such as corona treatment or plasma treatment before application of the hard coat layer. An adhesion enhancement layer (primer layer) or the like may be provided on a surface of the transparent resin film. Since the hard coat layer formed by curing the polyorganosiloxane compound exhibits high adhesion to a resin film, it is not necessary to provide an adhesion enhancement layer or the like. In other words, the transparent film 1 and the hard coat layer 3 may be in contact with each other in the hard coat film.

Figure 2:
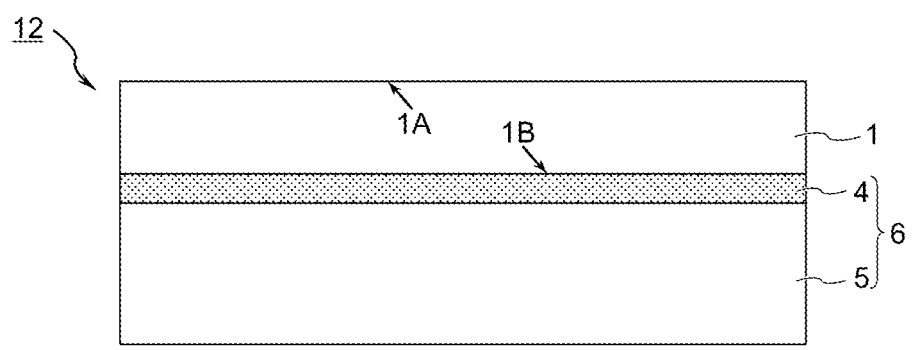
FIG. 2 is a sectional view of a laminate in which a support film is bonded to a transparent resin film.

As shown in FIG. 2, the support film 6 may be bonded to the second principal surface 1B of the transparent resin film 1 before the hard coat composition is applied to the first principal surface 1A of the transparent resin film 1. The support film 6 is preferably one peelable from the transparent resin film 1, and for example, a laminate including a weak pressure-sensitive adhesive layer 4 on a surface of the film 5 is used.

Figure 3:
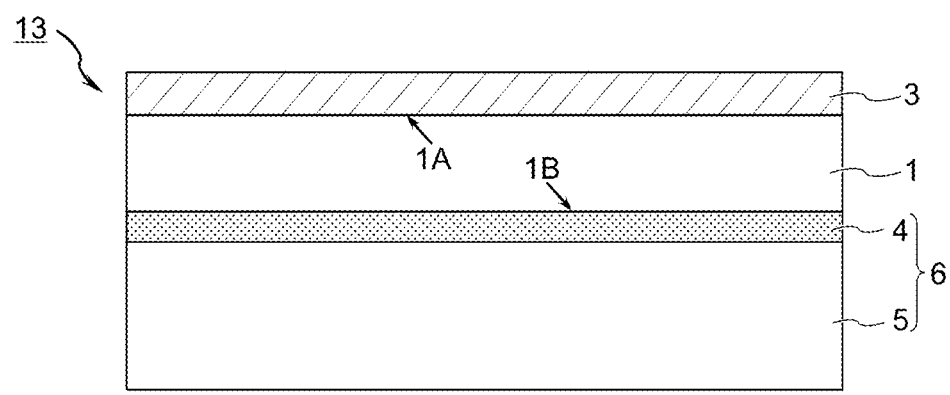
FIG. 3 is a sectional view of a hard coat film to which a support film is bonded.

With the support film 6 bonded to the second principal surface 1B of the transparent resin film, the hard coat composition is applied to the first principal surface 1A of the transparent resin film and cured to form a laminate in which the hard coat film and the support film 6 are laminated as shown in FIG. 3. The support film is peeled off from the laminate to obtain a hard coat film 10 shown in FIG. 1.

By forming the hard coat layer 3 with the support film 6 bonded to constitute the laminate, deformation or thermal damage of the transparent resin film during heating or light irradiation may be suppressed. By bonding the support film 6, the overall thickness increases to enhance the rigidity of the laminate 12, so that occurrence of curling during formation of the hard coat layer is suppressed, leading to improvement of handleability.

From the viewpoint of imparting rigidity to the laminate 12 of the transparent resin film 1 and the support film 6, the thickness of the support film 6 is preferably larger than the thickness of the transparent resin film 1. The thickness of the support film 6 is preferably 50 µm or more, more preferably 80 µm or more, further preferably 100 µm or more. From the viewpoint of maintaining handleability in roll conveyance or the like, the thickness of the support film is preferably 500

μm or less, more preferably 300 μm or less, and may be 200 μm or less, or 150 μm or less.

The method for applying the hard coat composition onto the transparent resin film is not particularly limited, and a known method can be employed. Examples of the application method include die coaters such as fountain dies and slot dies, roll coaters such as gravure coaters and comma coaters, bar coaters, dip coaters, spin coaters, and spray coaters.

Examples of the active energy ray applied during photocuring include visible light rays, ultraviolet rays, infrared rays, X-rays, α-rays, β-rays, γ-rays and electron beams. An ultraviolet ray is preferable as the active energy ray because the ultraviolet ray has a high curing reaction rate and excellent energy efficiency. The cumulative irradiation amount of the active energy rays is, for example, about 50 to 10,000 mJ/cm$^2$, and may be set according to the type and the blending amount of the photocationic polymerization initiator, the thickness of the hard coat layer, and the like.

When the hard coat composition containing the polyorganosiloxane compound is irradiated with an active energy ray, the alicyclic epoxy group is subjected to ring-opening and cationic polymerization by an acid generated from the photocationic polymerization initiator, so that cuing proceeds to obtain a hard coat layer containing a cured resin having a structure of the following general formula (7).

$$[A\text{-}B\text{---}R^1\text{---}Si(O_{1/2})_xR^2{}_{3-x}] \quad (7)$$

A in formula (7) is a structure including an alicyclic ring obtained by reaction of an alicyclic epoxy group. The number of carbon atoms in A may be 7 or less. Examples of the structure in which the number of carbon atoms is 7 or less include structures obtained by reaction of a cyclohexene oxide group and represented by the rational formula $C_6H_9(OH)(O_{1/2})$, and structures obtained by reaction of a methylcyclohexene oxide group and represented by the rational formula $C_6H_8(OH)(O_{1/2})(CH_3)$. Among them, structures obtained by reaction of a cyclohexene oxide group having 6 carbon atoms and represented by the rational formula $C_6H_9(OH)(O_{1/2})$.

The hard coat layer obtained by curing the polyorganosiloxane compound contains a structural unit of the following formula (8) and a structural unit of the following formula (9).

$$[A\text{-}B\text{---}R^1\text{---}SiO_{3/2}] \quad (8)$$

$$[A\text{-}B\text{---}R^1\text{---}SiO_{2/2}\text{-}D] \quad (9)$$

In general formula (8) and general formula (9), A is the same as in general formula (7). In general formulae (7) to (9), B, $R^1$ and D are the same as in general formulae (1), (3) and (4). Even after the polyorganosiloxane compound is cured by reaction of the alicyclic epoxy group, the SiO bond network of the polysiloxane compound is maintained, and therefore the ratio (T3/T2 ratio) of the structure of formula (8): T3 form to the structure of formula (9): T2 form is equal to the T3/T2 ratio in the polyorganosiloxane compound before curing.

When the polyorganosiloxane compound includes a structure derived from silane compound (2), and $R^4$ in general formula (2) includes an epoxy group other than an alicyclic epoxy group, a reaction between an alicyclic epoxy group derived from silane compound (1) and an epoxy group derived from silane compound (2) and a reaction between the epoxy groups derived from silane compound (2) occur in addition to a reaction between the alicyclic epoxy groups derived from silane compound (1).

In the polyorganosiloxane compound having an alicyclic epoxy group, the molecular volume is likely to increase due to curing because a bond is formed between two alicyclic rings by reaction of alicyclic epoxy groups. Because the hard coat composition has a negative cure shrinkage ratio, cure shrinkage is smaller as compared to a case where a common acryl-based hard coat material is used, so that curling of the hard coat film can be reduced.

When the linear expansion coefficient of the hard coat layer is larger than the linear expansion coefficient of the transparent resin film, the amount of curling can be appropriately controlled by setting the temperature during active energy ray irradiation higher than room temperature. This is because stress at the interface between the hard coat layer and the transparent resin film, which is generated by negative cure shrinkage (volumetric expansion), is canceled by a difference in linear expansion coefficient between the hard coat layer and the transparent resin film (a difference in the amount of shrinkage when the temperature is returned from that in a heated state to room temperature).

From the viewpoint of reducing the amount of curling, the temperature during active energy ray irradiation is preferably 35° C. or higher, more preferably 45° C. or higher, further preferably 50° C. or higher, and may be 55° C. or higher, or 60° C. or higher. From the viewpoint of suppressing plastic deformation of the transparent resin film by heat, the temperature during active energy ray irradiation is preferably 150° C. or lower, more preferably 120° C. or lower, and may be 100° C. or lower, 90° C. or lower, or 85° C. or lower.

The acid as an active species in photocationic polymerization remains in the composition even after active energy ray irradiation, and the reaction rate is small at a temperature that is as low as room temperature. Thus, even after active energy ray irradiation, the curing reaction may proceed for several days, leading to a gradual change in curling of the hard coat film. In such a case, it is also possible to obtain a hard coat film having a smaller amount of curling by performing active energy ray irradiation in consideration of the temporal change of the curling.

The hard coat composition has a negative cure shrinkage ratio, and therefore when curing proceeds, tensile stress is generated at the interface between the hard coat layer and the transparent resin film, so that a force to cause curling with the hard coat layer-formed surface on the outer side acts. When the temperature during active energy ray irradiation is set high and photocuring is performed with the hard coat layer thermally expanded to a large extent, curling is likely to occur with the hard coat film-formed surface on the inner side because of a large amount of shrinkage of the hard coat layer when the temperature is returned to room temperature. Thereafter, curing proceeds with time at room temperature, and thus negative curing shrinkage (volumetric expansion) occurs in the hard coat layer, so that curling is reduced with time to obtain a hard coat film having a small amount of curling.

Heating may be performed after active energy ray irradiation. Because the curing rate is increased by heating to reduce the amount of uncured component, a change in the amount of curling with time can be suppressed. In addition, it can be expected that the hardness of the hard coat layer increases due to an increase in curing ratio. When heating is performed after active energy ray irradiation, the heating temperature is, for example, 35° C. or higher, preferably 50° C. or higher, more preferably 70° C. or higher, and may be 80° C. or higher, 90° C. or higher, or 100° C. or higher. From the viewpoint of suppressing plastic deformation of the hard coat film, the heating temperature is preferably 180° C. or lower, more preferably 150° C. or lower. The heating time is, for example, about 10 seconds to 60 minutes, and may be 20 seconds or more, 30 seconds or more, 40 seconds or more, 50 seconds or more, or 60 seconds or more, and may be 50 minutes or less, 40 minutes or less, 30 minutes or less, 20 minutes or less, 10 minutes or less, or 5 minutes or less.

Properties of Hard Coat Film

The hard coat layer having a polymer matrix crosslinked by ring-opening and polymerization reaction of the alicyclic epoxy groups of the polyorganosiloxane compound can attain a surface hardness comparable to that of glass. The surface hardness (pencil hardness) of the hard coat layer-formed surface of the hard coat film is preferably 2H or more, more preferably 4H or more, and may be 6H or more, 7H or more, or 8H or more.

In the hard coat film, the diameter p of the mandrel at which the hard coat layer is cracked is preferably small when a cylindrical mandrel test is conducted with the hard coat layer-formed surface on the inner side. As long as there is no difference in thickness of the hard coat layer, the smaller the diameter of the mandrel, the better the flex resistance. The diameter of the mandrel at which the hard coat layer is cracked is preferably 3 mm or less, more preferably 2 mm or less. As described above, there is a tendency that the smaller the T3/T2 ratio of the polyorganosiloxane compound, the better the flex resistance and the smaller the mandrel diameter φ.

The total light transmittance of the hard coat film is preferably 80% or more, more preferably 85% or more, further preferably 89% or more.

Application of Hard Coat Film

The hard coat film may include various functional layers on the hard coat layer 3 or on the second principal surface 1B of the transparent resin film 1. In addition, a functional layer may be provided between the transparent resin film 1 and the hard coat layer 3. Examples of the functional layer include adhesion imparting layers, pressure sensitive adhesive layers, antireflection layers, water-repellent layers, oil-repellent layers, transparent conductive layers, refractive index adjusting layers, antistatic layers, anti-glare layers, and polarizer-containing layers.

The hard coat film according to the present application is suitably used for cover windows arranged on surfaces of image display panels, transparent substrates for displays, transparent substrates for touch panels, substrates for solar cells, etc. The hard coat film of the present application is particularly suitably used as a cover window or a substrate film for curved displays and flexible displays.

EXAMPLES

Hereinafter, the present application will be described in detail by showing production examples of hard coat film having a hard coat layer on a transparent resin film, but the present application is not limited to the following examples.

Transparent Resin Film

Synthesis of Polyimide Resin

Dimethylformamide (DMF) was added into a reaction vessel, and stirred in a nitrogen atmosphere. To this was added a diamine and a tetracarboxylic dianhydride at molar ratios as shown in Table 1, and the mixture was reacted by stirring in a nitrogen atmosphere for 5 to 10 hours to obtain a polyamic acid solution having a solid content concentration of 18%.

To the polyamic acid solution, pyridine was added as an imide catalyst, and completely dispersed, acetic anhydride was then added as a dehydrating agent, and the mixture was stirred at 90° C. for 3 hours. The reaction solution was cooled to room temperature, isopropyl alcohol (IPA) was then added dropwise with stirring to precipitate a polyimide resin. The precipitate was filtered, washed with IPA, and then dried in vacuum to obtain polyimide resin A and polyimide resin B.

Table 1 shows the addition ratios (molar ratios) of the monomers (diamine and tetracarboxylic dianhydride) used for producing polyimide resin A (PI-A) and polyimide resin B (PI-B). Abbreviations of monomers in Table 1 are as follows.

TFMB: 2,2'-bis(trifluoromethyl)benzidine
3,3'-DDS: 3,3'-diaminodiphenylsulfone
TMHQ: p-phenylenebistrimellitic dianhydride
6FDA: 2,2-bis(3,4-dicarboxyphenyl)-1,1,1,3,3,3-hexafluoropropanoic acid dianhydride
BPDA: 3,3',4,4'-biphenyltetracarboxylic dianhydride
CBDA: 1,2,3,4-cyclobutanetetracarboxylic acid dianhydride
TAHMBP: 2,2',3,3',5,5'-hexamethyl-biphenyltetracarboxylic dianhydride

TABLE 1

| | Diamine | | Tetracarboxylic dianhydride | | | | |
|---|---|---|---|---|---|---|---|
| | TFMB | 3,3'-DDS | TMHQ | 6FDA | BPDA | CBDA | TAHMBP |
| PI-A | 70 | 30 | 25 | 50 | 25 | 0 | 0 |
| PI-B | 90 | 10 | 0 | 20 | 15 | 15 | 50 |

Polyimide Film 1

The polyimide resin A was dissolved in methylene chloride to prepare a solution having a solid content concentration of 11 wt %. This methylene chloride solution was applied onto an alkali-free glass plate, and dried at 40° C. for 60 minutes, 70° C. for 30 minutes, 150° C. for 30 minutes, 170° C. for 30 minutes and 200° C. for 60 minutes in an air atmosphere to obtain a polyimide film 1 having a thickness of 50 μm. The linear expansion coefficient of the polyimide film 1 (PI1) determined from a TMA curve where the film was heated to 100° C. and then cooled to 30° C. at 5° C./min in thermomechanical analysis (TMA) was 30 ppm/° C.

Polyimide Film 2

Except that the thickness to which the solution was applied was changed, the same procedure as in production of the polyimide film 1 was carried out to obtain a polyimide film 2 having a thickness of 35 μm. The linear expansion coefficient of the polyimide film 2 (PI2) was 30 ppm/° C.

Polyimide Film 3

Except that polyimide resin B was used instead of polyimide resin A and the thickness to which the solution was applied was changed, the same procedure as in production of the polyimide film 1 was carried out to obtain a polyimide film 3 having a thickness of 30 μm. The linear expansion coefficient of the polyimide film 3 (PI3) was 16 ppm/° C.

Polyethylene Terephthalate Film 1

A 125 μm-thick thick polyethylene terephthalate film ("LUMIRROR U48" manufactured by Toray Industries, Inc.) was used. The linear expansion coefficient of a polyethylene terephthalate film 1 (PET1) was 15 ppm/° C.

Polyethylene Terephthalate Film 2

A 50 μm-thick polyethylene terephthalate film ("LUMIRROR U48" manufactured by Toray Industries, Inc.) was used. The linear expansion coefficient of the polyethylene terephthalate film 2 (PET2) was 15 ppm/° C.

Synthesis of Polyorganosiloxane Compound

Synthesis Example 1

A reaction vessel equipped with a thermometer, a stirrer and a reflux condenser was charged with 66.5 g (270 mmol) of 2-(3,4-epoxycyclohexyl)ethyltrimethoxysilane ("SILQUEST A-186" manufactured by Momentive Performance Materials Inc.) and 16.5 g of 1-methoxy-2-propanol (PGME), and the mixture was homogeneously stirred. To the mixed solution, a solution obtained by dissolving 0.039 g (0.405 mmol) of magnesium chloride as a catalyst in a mixed solution of 9.7 g (539 mmol) of water and 5.8 g of methanol was added dropwise over 5 minutes, and the mixture was stirred to homogeneity. Thereafter, the solution was heated to 80° C., and a polycondensation reaction was carried out for 6 hours with stirring. After completion of the reaction, the solvent and water were distilled off by a rotary evaporator to obtain polyorganosiloxane compound A.

From a $^1$H-NMR spectrum measured with deuterated acetone as a solvent using NMR (400 MHz) manufactured by Bruker, it was confirmed that the residual ratio of epoxy groups in the polyorganosiloxane compound 1 was 95% or more. The weight average molecular weight in terms of polystyrene, which was measured with THF as a solvent using a GPC apparatus "HLC-8220 GPC" (columns: two TSKgel GMHXLs, TSKgel G 3000 HXL and TSKgel G 2000 HXL) manufactured by Tosoh Corporation, was 3000. The ratio T3/T2 (molar ratio) between T3 form and T2 form, which was determined from a $^{29}$Si-NMR spectrum measured by NMR (600 MHz) manufactured by Agilent Technologies, was 2.3. The residual amount of magnesium chloride (neutral salt catalyst) in polyorganosiloxane compound 1, which was calculated on the basis of the addition amount, was 814 ppm.

Synthesis Example 2

A reaction vessel equipped with a thermometer, a stirrer and a reflux condenser was charged with 67.4 g (220 mmol) of 8-glycidyloxyoctyltrimethoxysilane ("KBM-4803" manufactured by Shin-Etsu Chemical Co., Ltd.) and 11.6 g of methanol, and the mixture was homogeneously stirred. To the mixed solution, a solution obtained by dissolving 0.010 g (0.11 mmol) of magnesium chloride as a catalyst in a mixed solution of 11.9 g (660 mmol) of water and 4.7 g of methanol was added dropwise over 5 minutes, and the mixture was stirred to homogeneity. Thereafter, the solution was heated to 70° C., and a polycondensation reaction was carried out for 6 hours with stirring. After completion of the reaction, methanol and water were removed by a rotary evaporator to obtain polyorganosiloxane compound B.

In polyorganosiloxane compound 2, the residual ratio of epoxy groups was 95% or more, the molecular weight in terms of polystyrene was 4,500, T3/T2 was 2.1, and the residual amount of magnesium chloride (neutral salt catalyst) was 191 ppm.

Hard Coat Composition

Hard Coat Composition 1

To 100 parts by weight of polyorganosiloxane compound A, 81.8 parts by weight of propylene glycol monomethyl ether, 0.2 parts by weight, in terms of a solid content, of a propylene carbonate solution of triaryl sulfonium/SbF$_6$ salt ("CPI-101A" manufactured by San-Apro Ltd.) as a photocationic polymerization initiator and 0.5 parts by weight, in terms of a solid content, of a xylene/isobutanol solution of polyether-modified polydimethylsiloxane ("BYK-300" manufactured by BYK) as a leveling agent were added to obtain a hard coat composition 1.

Hard Coat Composition 2

Except that the amount of the photocationic polymerization initiator was changed to 2 parts by weight, the same procedure as in preparation of the hard coat composition 1 was carried out to obtain a hard coat composition 2.

Hard Coat Composition 3

Except that the leveling agent was changed to a fluorine-based leveling agent ("Megafac RS-90" manufactured by DIC Corporation), and the addition amount was changed to 0.3 parts by weight in terms of a solid content, the same procedure as in preparation of the hard coat composition 1 was carried out to obtain a hard coat composition 3.

Hard Coat Composition 4

To 100 parts by weight of polyorganosiloxane compound B, 0.5 parts by weight, in terms of a solid content, of a propylene carbonate solution of triaryl sulfonium.P(Rf)$_n$F$_{6-n}$ salt ("CPI-200K" manufactured by San-Apro Ltd.) at 50% and 0.5 parts by weight, in terms of a solid content, of a leveling agent ("BYK-300" manufactured by BYK) were added to obtain a hard coat composition 4.

Hard Coat Composition 5

100 parts by weight of dipentaerythritol hexaacrylate, 25 parts by weight of propylene glycol monomethyl ether, 3 parts by weight of 1-hydroxycyclohexyl phenyl ketone ("IRGACURE 184" manufactured by BASF SE) as a photoradical polymerization initiator and 0.5 parts by weight, in terms of a solid content, of a leveling agent ("BYK-300" manufactured by BYK) were mixed to obtain a hard coat composition 5.

Evaluation of Hard Coat Composition

A support film having a 10 μm-thick acryl-based pressure-sensitive adhesive layer provided on a 125 μm-thick polyethylene terephthalate film was bonded to one surface of the polyimide film 1, a hard coat composition was applied to the other surface to a dry thickness of 50 μm using a bar coater, and the laminate was heated at 120° C. for 2 minutes, and then irradiated with ultraviolet rays at an atmospheric temperature of 80° C. to an integral light amount of about 2,000 mJ/cm². The laminate was heated at 120° C. for 2 minutes to completely cure the hard coat composition, and immersed in methylene chloride to dissolve the polyimide film 1, thereby isolating a hard coat layer (cured product of the hard coat composition).

With the isolated hard coat layer as a sample, the linear expansion coefficient and the cure shrinkage ratio were measured. As in the case of the transparent resin film, the linear expansion coefficient was calculated from a TMA curve where the film was cooled from 100° C. to 30° C. The cure shrinkage ratio was calculated from the density of the hard coat composition before curing $\rho_L$ and the density of the hard coat layer after photocuring $\rho_C$ in accordance with the following expression.

Cure shrinkage ratio (%)=100×($\rho_C$−$\rho_L$)/$\rho_C$

For hard coat compositions 1 to 3, the density $\rho_L$ of the hard coat composition (solid) isolated after drying by heating and before ultraviolet ray irradiation (before curing) was measured by a density gradient tube method. For hard coat compositions 4 and 5, the density $\rho_L$ of a composition (liquid) freed of volatile components by heating at 120° C. for 2 minutes was measured by a pycnometry. The density of the hard coat layer after photocuring $\rho_C$ was measured by a density gradient tube method.

Table 2 shows the compositions, linear expansion coefficients and cure shrinkage ratios of hard coat compositions 1 to 5. For the compositions in Table 2, the amount of each component based on 100 parts by weight of the curable resin component is expressed in parts by weight.

TABLE 2

|  | Composition | 1 | 2 | 3 | 4 | 5 |
|---|---|---|---|---|---|---|
| Composition | Polyorganosiloxane A | 100 | 100 | 100 | — | — |
|  | Polyorganosiloxane B | — | — | — | 100 | — |
|  | Dipentaerythritol hexaacrylate | — | — | — | — | 100 |
|  | Photoacid generator CPI-101A | 0.2 | 2 | 2 | — | — |
|  | Photoacid generator CPI-200K | — | — | — | 0.5 | — |
|  | Photoradical polymerization initiator IRGACURE 184 | — | — | — | — | 3 |
|  | Silicone-based leveling agent BYK-300 | 0.5 | 0.5 | — | 0.5 | 0.5 |
|  | Fluorine-based leveling agent Megafac RS-90 | — | — | 0.3 | — | — |
| Properties | Linear expansion coefficient (ppm/° C.) | 65 | 65 | 65 | 115 | ND |
|  | Cure shrinkage ratio (%) | −2.0 | −2.0 | −2.0 | 3.9 | 11 |

The acryl-based hard coat composition 5 had a positive cure shrinkage ratio. The hard coat composition 4 containing a polyorganosiloxane compound having a non-alicyclic epoxy group as a cured resin component also had a positive cure shrinkage ratio. On the other hand, hard coat compositions 1 to 3 containing a polyorganosiloxane compound having an alicyclic epoxy group as a cured resin component had a negative cure shrinkage ratio with the volume increased (the composition expanded) by photocuring.

Hard Coat Film

Hard Coat Film 1

A support film having a 10 μm-thick acryl-based pressure-sensitive adhesive layer disposed on a 125 μm-thick polyethylene terephthalate film was bonded to one surface of the polyimide film 1. The hard coat composition 1 was applied to the other surface of the polyimide film to a dry thickness of 50 μm using a bar coater, and heated at 120° C. for 2 minutes. Thereafter, using a conveyable ultraviolet ray irradiation apparatus equipped with an ultraviolet ray irradiation lamp ("H Bulb" manufactured by Heraeus, amount of luminescent ray after output adjustment: 216 W/cm) arranged at a distance of 93 mm from the coating film, the film was conveyed at an atmospheric temperature of 80° C. and a conveyance rate of 2 m/min, and irradiated with an ultraviolet ray to an integral light amount of 1950 mJ/cm² as measured by an UV scale manufactured by FUJIFILM Corporation, so that the hard coat composition was cured to obtain a hard coat film 1 having a 50 μm-thick hard coat layer on the polyimide film 1.

Hard Coat Films 2 to 10

Except that the thickness of the hard coat layer and the curing conditions (atmospheric temperature during ultraviolet ray irradiation, and distance of ultraviolet ray irradiation lamp from coating film) were changed, the same procedure as in production of the hard coat film 1 was carried out to produce a hard coat film including a hard coat layer composed of a cured product of the hard coat composition 1 on the polyimide film 1. Hard coat films 4, 8 and 10 were heated at 120° C. for 2 minutes after being irradiated with an ultraviolet ray.

Hard Coat Films 11 to 13

To a polyimide film 2 instead of the polyimide film 1, the hard coat composition 1 was applied, and heated. Thereafter, using a conveyable ultraviolet ray irradiation apparatus equipped with an ultraviolet ray irradiation lamp (high-pressure mercury lamp "H03-L31" manufactured by EYE GRAPHICS CO., LTD., amount of luminescent ray after output adjustment: 120 W/cm) arranged at a distance of 200 mm from the coating film, the film was conveyed at a conveyance rate of 4 m/min, and irradiated with an ultraviolet ray so that the total integral light amount of UVA to UVC was 1,037 mJ/cm² as measured by "UV POWR PUCK II" from EIT Co., Ltd. Subsequently, except that the thickness of the hard coat layer and the atmospheric temperature during ultraviolet ray irradiation were changed as shown in Table 4, the same procedure as in production of the hard coat film 1 was carried out to produce a hard coat film including a hard coat layer composed of a cured product of the hard coat composition 1 on the polyimide film 2.

Hard Coat Films 14 to 16

Except that a polyimide film 3 was used instead of the polyimide film 2 and the atmospheric temperature during ultraviolet ray irradiation was changed as shown in Table 4, the same procedure as in production of hard coat films 11 to 13 was carried out to produce a hard coat film including a hard coat layer composed of a cured product of the hard coat composition 1 on the polyimide film 3.

Hard Coat Films 17 to 21

The polyethylene terephthalate film 1 was used instead of the polyimide film 1, and a hard coat layer was applied and irradiated with light without bonding a support film. Except that the thickness of the hard coat layer and the curing conditions (atmospheric temperature during ultraviolet ray irradiation, and distance of ultraviolet ray irradiation lamp from coating film) were changed, the same procedure as in production of the hard coat film 1 was carried out to produce a hard coat film including a hard coat layer composed of a cured product of the hard coat composition 1 on the polyethylene terephthalate film 1.

Hard Coat Films 22 to 36

A hard coat film was produced in the same manner as in each of the above examples except that the type of the transparent resin film, the composition of the hard coat layer, the thickness of the hard coat layer, and the curing conditions were changed as shown in Tables 5 and 6.

Evaluation

The above-described hard coat films were evaluated in accordance with the following procedures.

Curling

The hard coat film was cut into a square of 100 mm×100 mm, left standing in an environment at 23° C. and 55% RH for 10 days, and then placed on a horizontal table with the hard coat layer-formed surface on the upper side. The distances of the table to the four vertexes of the square (amount of elevation) were measured, and the average value thereof was taken as the amount of curling. When curling occurred with the hard coat layer-formed surface on the outer side, curling was measured with the film placed on a horizontal table with the hard coat layer-formed surface on the lower side, and the amount of curling was given a negative sign. When the film cut into a square curled into a cylindrical shape, so that it was not possible to measure the amount of curling, the amount of curling was set to +∞ in the case where the film curled with the hard coat layer-formed surface on the inner side, and the amount of curling was set to −∞ in the case where the film curled with the hard coat layer-formed surface on the outer side.

Surface Hardness

The pencil hardness of the hard coat layer-formed surface was measured according to JIS K5600-5-4: 1999.

Flexibility

In accordance with JIS K5600-5-1: 1999, a cylindrical mandrel test was performed for the hard coat films 1 to 16 using a type 1 testing machine with the hard coat layer-formed surface on the inner side. In any of the hard coat films 1 to 16, breakage or peeling of the hard coat layer did not occur when the film was bent along a mandrel having a diameter of 2 mm.

Tables 3 to 6 show the materials, preparation conditions and evaluation results for hard coat films 1 to 36.

TABLE 3

| | | | 1 | 2 | 3 | 4 | 5 | 6 | 7 | 8 | 9 | 10 |
|---|---|---|---|---|---|---|---|---|---|---|---|---|
| Transparent resin film | | | | | | | PI1 | | | | | |
| | Thickness $d_1$ | μm | | | | | 50 | | | | | |
| | Linear expansion coefficient | ppm/° C. | | | | | 30 | | | | | |
| Hard coat | | | | | | | 1 | | | | | |
| | Thickness $d_2$ | μm | 50 | 50 | 50 | 60 | 70 | 70 | 70 | 90 | 90 | 90 |
| | Linear expansion coefficient | ppm/° C. | | | | | | 65 | | | | |
| | Cure shrinkage ratio | % | | | | | | −2.0 | | | | |
| Curing conditions | Temperature | ° C. | 80 | 60 | 30 | 60 | 60 | 48 | 30 | 60 | 60 | 30 |
| | Amount of luminescent ray | W/cm | 216 | 216 | 216 | 216 | 216 | 216 | 216 | 216 | 216 | 216 |
| | Irradiation distance | mm | 93 | 93 | 93 | 93 | 93 | 93 | 93 | 93 | 103 | 93 |
| | Additional heating (120° C., 2 min) | — | Not done | Not done | Not done | Done | Not done | Not done | Not done | Done | Not done | Done |
| | Support film | — | | | | | Present | | | | | |
| Curling | | mm | 19.3 | 0 | −∞ | 3.8 | 7.0 | −10.5 | −∞ | 11.8 | −13.5 | −21.3 |
| Surface hardness | | — | ND | 8H | 9H | 9H | 9H | 9H | 9H | 9H | ND | 9H |

TABLE 4

| | | | 11 | 12 | 13 | 14 | 15 | 16 | 17 | 18 | 19 | 20 | 21 |
|---|---|---|---|---|---|---|---|---|---|---|---|---|---|
| Transparent resin film | | | | PI2 | | | PI3 | | | | PET1 | | |
| | Thickness $d_1$ | μm | | 35 | | | 30 | | | | 125 | | |
| | Linear expansion coefficient | ppm/° C. | | 30 | | | 16 | | | | 15 | | |

TABLE 4-continued

|  |  |  | 11 | 12 | 13 | 14 | 15 | 16 | 17 | 18 | 19 | 20 | 21 |
|---|---|---|---|---|---|---|---|---|---|---|---|---|---|
| Hard coat |  |  |  |  |  |  |  |  |  |  |  |  |  |
|  | Thickness $d_2$ | μm |  | 1 |  | 1 |  | 1 | 30 | 30 | 30 | 20 | 40 |
|  |  |  |  | 25 |  | 25 |  |  |  |  |  |  |  |
|  | Linear expansion coefficient | ppm/° C. |  | 65 |  | 65 |  |  |  |  | 65 |  |  |
|  | Cure shrinkage ratio | % |  | −2.0 |  | −2.0 |  |  |  |  | −2.0 |  |  |
| Curing conditions | Temperature | ° C. | 90 | 60 | 30 | 90 | 60 | 30 | 68 | 45 | 30 | 68 | 68 |
|  | Amount of luminescent ray | W/cm | 120 | 120 | 120 | 120 | 120 | 120 | 216 | 216 | 216 | 216 | 216 |
|  | Irradiation distance | mm | 200 | 200 | 200 | 200 | 200 | 200 | 53 | 53 | 53 | 53 | 53 |
|  | Support film | — |  |  | Present |  |  |  |  |  | None |  |  |
| Curling |  | mm | 34.8 | −16.0 | −∞ | +∞ | 12.8 | −∞ | 6.3 | −8.8 | −20.3 | 7.3 | 5.0 |
| Surface hardness |  | — | 4H | 4H | 4H | 4H | 4H | 4H | ND | 3H | 2H | ND | ND |

TABLE 5

|  |  |  | 22 | 23 | 24 | 25 | 26 | 27 | 28 | 29 |
|---|---|---|---|---|---|---|---|---|---|---|
| Transparent resin film |  |  |  |  |  | PI1 |  |  | PET1 | PI2 |
|  | Thickness $d_1$ | μm |  |  |  | 50 |  |  | 125 | 35 |
|  | Linear expansion coefficient | ppm/° C. |  |  |  | 30 |  |  | 15 | 30 |
| Hard coat |  |  |  |  |  | 2 |  |  | 2 | 3 |
|  | Thickness $d_2$ | μm | 70 | 70 | 70 | 30 | 30 | 30 | 30 | 25 |
|  | Linear expansion coefficient | ppm/° C. |  |  |  | 65 |  |  | 65 | 65 |
|  | Cure shrinkage ratio |  |  |  |  | −2.0 |  |  | −2.0 | −2.0 |
| Curing conditions | Temperature | ° C. | 60 | 48 | 30 | 85 | 67 | 30 | 85 | 60 |
|  | Amount of luminescent ray | W/cm | 216 | 216 | 216 | 216 | 216 | 216 | 216 | 120 |
|  | Irradiation distance | mm | 93 | 93 | 93 | 53 | 53 | 53 | 53 | 200 |
|  | Support film | — |  |  | Present |  |  |  | None | Present |
| Curling |  | mm | 8.3 | −5.5 | −32.0 | 8.8 | −11.3 | −∞ | 3.8 | −2.5 |
| Surface hardness |  | — | 9H | 9H | ND | 6H | 6H | 6H | 3H | 4H |

TABLE 6

|  |  |  | 30 | 31 | 32 | 33 | 34 | 35 | 36 |
|---|---|---|---|---|---|---|---|---|---|
| Transparent resin film |  |  | PI1 |  | PI1 |  |  | PET2 |  |
|  | Thickness $d_1$ | μm | 50 |  | 50 |  |  | 50 |  |
|  | Linear expansion coefficient | ppm/° C. | 30 |  | 30 |  |  | 15 |  |
| Hard coat |  |  | 4 |  | 5 |  |  | 5 |  |
|  | Thickness $d_2$ | μm | 50 | 50 | 50 | 50 | 50 | 50 | 50 |
|  | Linear expansion coefficient | ppm/° C. | 115 |  | ND |  |  | ND |  |
|  | Cure shrinkage ratio |  | 3.9 | 11 | 11 | 11 | 11 | 11 | 11 |
| Curing conditions | Temperature | ° C. | 80 | 60 | 80 | 30 | 60 | 80 | 30 |
|  | Amount of luminescent ray | W/cm | 133 | 120 | 120 | 120 | 120 | 120 | 120 |
|  | Irradiation distance | mm | 93 | 200 | 200 | 200 | 200 | 200 | 200 |
|  | Support film | — | Present |  | Present |  |  | Present |  |
| Curling |  | mm | +∞ | +∞ | +∞ | +∞ | +∞ | +∞ | +∞ |

As shown in Table 6, the sample cut into a square was curled into a cylindrical shape with the hard coat layer on the inner side regardless of the type of transparent resin film and the curing temperature for hard coat films 31 to 36 using the acryl-based hard coat composition 5 having a positive cure shrinkage ratio. The hard coat film 30 using the hard coat composition 4 containing a polyorganosiloxane compound having anon-alicyclic epoxy group as a cured resin component was also curled into a cylindrical shape with the hard coat layer on the inner side.

All hard coat films 1 to 29 using a hard coat composition having a negative cure shrinkage ratio were less curled as compared with hard coat films 30 to 36.

Comparison of hard coat films 1 to 3 showed that it tended to become more likely that curling occurred in a negative amount (with the hard coat layer-formed surface on the outer side) as the temperature during ultraviolet ray irradiation decreased. Comparison of hard coat films 5 to 7 and comparison between the hard coat film 8 and the hard coat film 10 showed the same tendency as described above. These results show that when a hard coat composition having a negative cure shrinkage ratio is used and the heating temperature during ultraviolet ray irradiation is adjusted, a hard coat film having little amount of curling can be obtained even if the hard coat layer has a large thickness.

From the results shown in Table 4 to 6, it can be seen that even when the type of transparent resin film, the amount of the photocationic polymerization initiator used in the hard coat composition, the type of leveling agent, and the like are changed, a hard coat film having little amount of curling can be obtained by adjusting the temperature during ultraviolet ray irradiation. When a polyimide film was used as the transparent resin film, the surface hardness tended to be higher as compared to a case where a PET film was used.

The invention claimed is:

1. A method for producing a hard coat film, the hard coat film comprising: a transparent resin film having a first principal surface and a second principal surface; and a hard coat layer composed of a cured product of a hard coat composition and disposed on the first principal surface of the transparent resin film, wherein a thickness of the hard coat layer is 0.15 times or more of a thickness of the transparent resin film, the method comprising:
applying a hard coat composition onto the first principal surface of the transparent resin film; and
thereafter irradiating the hard coat composition with an active energy ray to form the hard coat layer, wherein the hard coat composition has a negative cure shrinkage ratio,
the active energy ray irradiation is performed with a support film bonded to the second principal surface of the transparent resin film, wherein a pressure sensitive adhesive layer is provided between the support film and the second principal surface of the transparent resin film and the support film has a thickness larger than that of the transparent resin film, and
the active energy ray irradiation is performed in a heating atmosphere at a temperature of 45 to 90° C.

2. The method for producing a hard coat film according to claim 1, wherein the temperature of the heating atmosphere during the active energy ray irradiation is 45 to 85° C.

3. The method for producing a hard coat film according to claim 1, wherein the hard coat composition includes a condensate of a silane compound represented by general formula (1):

$$E\text{-}B\text{—}R^1\text{—}Si(OR^3)_x R^2_{3-x} \tag{1}$$

wherein in general formula (1), E is an alicyclic epoxy group, B is a direct coupling, an ether group or an ester group, $R^1$ is an alkylene group having 2 to 12 carbon atoms; $R^2$ is a hydrogen atom, or a monovalent hydrocarbon group selected from the group consisting of an alkoxy group having an alkyl group having 1 to 10 carbon atoms, an alkyl group having 1 to 10 carbon atoms, an aryl group having 6 to 25 carbon atoms, and an aralkyl group having 7 to 12 carbon atoms; x is 2 or 3; and $R^3$ is a hydrogen atom or an alkyl group having 1 to 10 carbon atoms.

4. The method for producing a hard coat film according to claim 1, wherein the hard coat composition contains a photocationic polymerization initiator.

5. The method for producing a hard coat film according to claim 1, wherein heating is performed after the active energy ray irradiation.

6. The method for producing a hard coat film according to claim 1, wherein an absolute value of an amount of curling of a sample of the hard coat film having a square shape and a size of 100 mm×100 mm is 20 mm or less.

7. The method for producing a hard coat film according to claim 1, wherein the support film is removed after irradiating the hard coat composition with the active energy ray.

8. The method for producing a hard coat film according to claim 1, wherein the hard coat layer has a larger linear expansion coefficient than the transparent resin film.

9. The method for producing a hard coat film according to claim 1, wherein the transparent resin film includes at least one resin material selected from the group consisting of a polyester, a polycarbonate, a polyamide, a polyimide, a cyclic polyolefin, an acrylic resin, and a cellulose-based resin.

10. The method for producing a hard coat film according to claim 1, wherein the transparent resin film has a thickness of 10 to 150 μm.

11. The method for producing a hard coat film according to claim 1, wherein the hard coat layer has a thickness of 2 to 150 μm.

12. The method for producing a hard coat film according to claim 1, wherein the support film has a thickness of 50 to 500 μm.

* * * * *